Sept. 17, 1940.  G. G. PHILLIPS  2,215,275
FISHHOOK EXTRACTOR
Filed Nov. 28, 1938
Fig. 1.
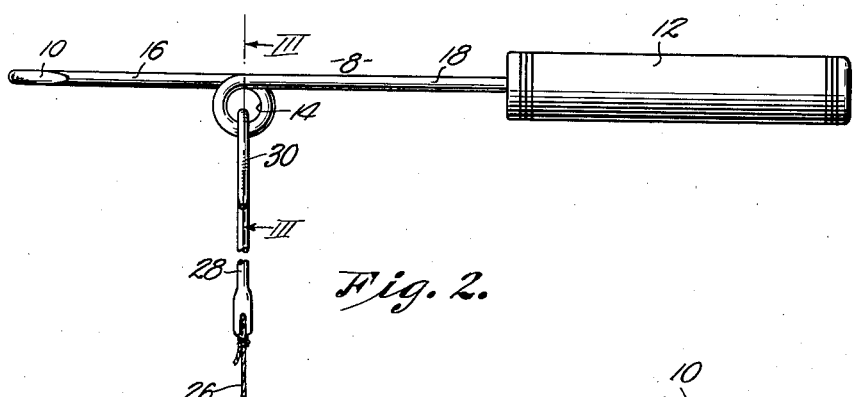
Fig. 2.
Fig. 5.
Fig. 3.
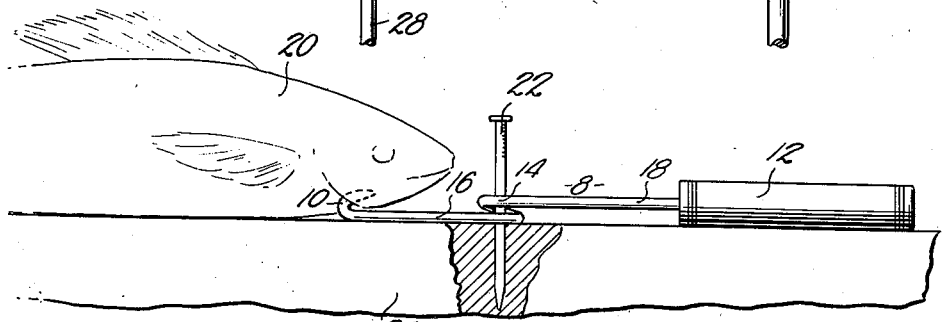
Fig. 4.
INVENTOR.
Gerald G. Phillips
BY
Hovey & Hamilton
ATTORNEYS Patented Sept. 17, 1940

2,215,275

UNITED STATES PATENT OFFICE 2,215,275

FISHHOOK EXTRACTOR

Gerald G. Phillips, Independence, Mo.

Application November 28, 1938, Serial No. 242,721

4 Claims. (Cl. 43—29)

This invention relates to a fishhook extractor which is provided with a detachable stringer bar and convenient means for supporting the same, which means may be employed for the purpose of rendering the extractor useful in cleaning fish.

A further object of this invention is to provide a fishhook extractor which has a uniquely formed shank associated with a handle of special form and size and which includes a loop intermediate the ends of the shank of the extractor that may be used to hold the device in a pocket against accidental removal therefrom.

A yet further aim of the instant invention is to provide a fishhook extractor that is cheap to manufacture, neat in appearance, convenient to use, and adaptable by the fisherman for employment as an anchoring element for fish being cleaned and as a holder for a stringer bar.

Further objects of the invention will appear during the course of the following specification, referring to the accompanying drawing wherein:

Figure 1 is an elevational view of one side of a fishhook extractor, made in accordance with the present invention.

Fig. 2 is an elevational view of another side of the fishhook extractor showing the stringer bar in position.

Fig. 3 is an enlarged fragmentary detailed sectional view through the extractor, taken on line III—III of Fig. 2.

Fig. 4 is a side view of the fishhook extractor showing the same adapted for use as an anchoring element for fish being cleaned; and Fig. 5 is a fragmentary cross sectional view through the fishhook extractor and a stringer bar which is made in accordance with the modified form of the invention.

In constructing a fishhook extractor embodying the preferred form of the invention, a length of heavy wire in the nature of a shank 8, is first rebent upon itself at one end to create a hook 10. One leg of this hook is relatively short and should be tapered so as to present a leg which progressively decreases in diameter as the free end thereof is approached. Thus, the bight of the hook 10 is relatively narrow while the mouth thereof is wide enough to conveniently catch the cord of the tackle above its point of juncture with the hook.

A handle 12 is fitted onto the other end of shank 8 and in the commercial form, this handle may be made of wood or some suitable composition which is light, durable yet appealing to the eye. The diameter of this handle 12 should be as hereinafter set forth, and therefore, a cylindrical handle of the same cross sectional area throughout its length, has been found practical.

A specially contoured loop 14 is formed intermediate the ends of shank 8. This loop is created by bending an intermediate length of shank 8 into spiral form so that short lengths of shank 8 are in overlapping relation and spaced apart, as shown in Fig. 1.

The portion 16 of shank 8 between hook 10 and loop 14 is parallel to the major axis of portion 18 of shank 8 between loop 14 and handle 12. Portions 16 and 18 of shank 8 therefore, are in offset relation and the space between the ends of these portions receives the flap of a pocket when the extractor is being carried by the sportsman. The loop thus formed presents a holding clip which precludes accidental displacement of the extractor when being carried and not in use.

Loop 14 is to one side of the major axes of portions 16 and 18, and is in a plane perpendicular to the major plane of hook 10. Reference to Figs. 1 and 4 will teach the manner in which portion 16 of shank 8 has its outer face in the same plane as one side of handle 12. This extractor is particularly useful as a holder for fish 20 when the same is being skinned or scraped.

Hook 10 is engaged in the gill of the fish and a nail or similar member 22 is passed through loop 14 and into a table or supporting member 24. When the extractor is so positioned (Fig. 4), one face of handle 12 lies on the surface of table 24 and in the same plane with the outer face of portion 16. Rigidity is thereby insured and the necessary operations to clean fish 20 may be carried on without objectionable displacement of the extractor which is being employed as a holder.

The fisherman usually carries a stringer bar to one end of which is attached a cord 26. This cord may be secured to one end of stringer bar 28 in any suitable manner and the length of bar 28 is usually about as long as shank 8 between handle 12 and hook 10.

Stringer bar 28 is provided with a hook 30 at the other end thereof and this hook engages loop 14, as shown in Figs. 2 and 3. The entrance to hook 30 is slightly narrower than the diameter of the rod from which shank and loop 18 and 14 respectively, are formed, and bar 28 should be of resilient material allowing hook 30 to be snapped into place and removably supported. In so carrying stringer bar 28, it is convenient for use immediately before or after the fishhook has been extracted by the employment of hook 10.

The modified form of stringer bar 28 is shown in Fig. 5 and in that instance, hook 40 is provided with a resilient tongue 42 in the nature of a harness snap construction so that stringer 28 may be conveniently removably held in place on loop 14. The extractor may be used with stringer bar 28 thereon and when the fish are all strung on cord 26, shank 18 becomes a convenient handle to carry the catch.

When removing the fishhook from the fish, hook 10 is slid along the fishhook toward the barb and when the lowermost portion of the fishhook bight is engaged, the hand holding the string above the fishhook, draws the latter around the hook 10 to reverse the position of the fishhook, so that its point is downwardly directed to allow the fish to drop cleanly therefrom.

The preferred embodiment of the invention has been shown and described, and it is understood that modifications might be made without departing from the spirit of the invention or scope of the appended claims.

Having thus described the invention, what is claimed as new and desired to be secured by Letters Patent is:

1. A fishhook extractor comprising a shank bent at one end to create a hook; a handle on the other end of the shank; and a loop formed in the shank intermediate the ends thereof, said loop being to one side of the longitudinal axis of the shank, the portions of said shank on each side of the loop having their axes in parallel spaced apart relation.

2. A fishhook extractor comprising a shank bent at one end to create a hook; a handle on the other end of the shank; and a spiral loop formed in the shank intermediate the ends thereof, said loop being to one side of the longitudinal axis of the shank and having the spiral portions thereof spaced apart, the hook and said loop being in planes perpendicular to each other whereby a pocket flap may be received between the spirals of the loop when the shank is moved longitudinally into the pocket.

3. A fishhook extractor comprising a shank bent at one end to create a hook; a handle on the other end of the shank; and a loop formed in the shank intermediate the ends thereof, said loop being spiral in form whereby to dispose the portion of said shank between the hook and loop to another side of the portion of the shank between the loop and said handle, the handle being provided with a face in the same plane as the outer face of that portion of the shank between said hook and said loop.

4. A fishhook extractor comprising a wire shank bent upon itself at one end to create a hook; a handle fitted over the other end of the shank; and a loop formed in the shank intermediate the said hook and said handle, the portion of said shank forming said loop being spirally disposed whereby portions of the shank at the loop are in overlapping relation, the overlapped portions of said shank being spaced apart to provide a pocket-wall engaging element as described, said loop being to one side of the longitudinal axis of the shank and in a major plane perpendicular to the major plane of the hook at the one end of the shank, the portion of said shank between the hook and said loop being parallel to and spaced to one side of the portion of said shank between the loop and said handle, the handle having a surface in the same plane as the outer surface of the portion of the shank between the loop and said hook whereby when the loop is in a horizontal plane on a supporting surface, the said hook is disposed in a vertical plane and the said shank is horizontally positioned throughout its length.

GERALD G. PHILLIPS.